United States Patent [19]

Touzani

[11] E Patent Number: Re. 32,379

[45] Reissued Date of Patent: Mar. 24, 1987

[54] COLLAPSIBLE BOTTLE

[76] Inventor: William Touzani, 7356 Lighthouse Dr., Stockton, Calif. 95209

[21] Appl. No.: 808,635

[22] Filed: Dec. 13, 1985

Related U.S. Patent Documents

Reissue of:

[64] Patent No.: 4,492,313
Issued: Jan. 8, 1985
Appl. No.: 614,860
Filed: May 29, 1984

[51] Int. Cl.[4] ..... B65D 1/40
[52] U.S. Cl. ..... 215/1 C; 150/55
[58] Field of Search ..... 215/1 C; 150/55; 220/4 A, 8, 85 A, 85 B; 222/213, 215

[56] References Cited

U.S. PATENT DOCUMENTS

| | | | |
|---|---|---|---|
| 1,668,895 | 5/1928 | Fulton | 222/213 |
| 2,880,902 | 4/1959 | Owsen | 150/55 X |
| 2,899,110 | 8/1959 | Parker | 215/1 C |
| 3,201,111 | 8/1965 | Afton | 150/55 X |
| 3,220,544 | 11/1965 | Lovell | 220/8 X |
| 3,301,293 | 1/1967 | Santelli | 150/55 |
| 3,474,844 | 10/1969 | Lindstrom et al. | 215/1 C |
| 3,586,084 | 6/1971 | Redmond | 150/55 |
| 3,587,937 | 6/1971 | Childs . | |
| 4,044,836 | 8/1977 | Martin et al. | 222/215 |
| 4,377,191 | 3/1983 | Yamaguchi | 150/55 |
| 4,438,856 | 3/1984 | Chang | 215/1 C X |
| 4,456,134 | 6/1984 | Cooper | 215/1 C X |

OTHER PUBLICATIONS

Packaging in Today's Society, Robert J. Kelsey, 1978, p. 48.

Modern Packaging Encyclopedia, 1968, Looking Ahead with Glass, p. 314.

Verkauf Kunststoffe, Marketing-Koord, K-Nachrichten, 1978, p. 54, Collapsible Bottle of Azlon Products.

*Primary Examiner*—Steven M. Pollard
*Attorney, Agent, or Firm*—James M. Deimen

[57] ABSTRACT

A collapsible or foldable plastic bottle of circular bellows like configuration capable of manufacture on current plastic bottle manufacturing equipment with current plastic materials approved for contact with foods and beverages. The bellows over center and fold to retain the folded condition without external assistance thus providing a self-latching feature. In particular, the bellows of the bottle, when fully folded, cause the bottle to substantially fit within a cup fastened to the base of the bottle. The cup is generally formed by further extending the cup upward and increasing the diameter slightly in comparison with the reinforcing cup on current soda pop bottles.

23 Claims, 3 Drawing Figures

COLLAPSIBLE BOTTLE

Matter enclosed in heavy brackets [ ] appears in the original patent but forms no part of this reissue specification; matter printed in italics indicates the additions made by reissue.

BACKGROUND OF THE INVENTION

The field of the invention pertains to collapsible plastic bottles and in particular to collapsible plastic bottles for foods and beverages, such as soda pop. Such bottles are constructed of plastics approved by the Food and Drug Administration for intimate and prolonged contact with foods and beverages. These bottles are commonly used for a variety of brands of soda pop and are formed of a clear plastic in a two-stage molding process. Typically, the two-stage molding process comprises an injection molded preform that is subsequently positioned in a bottle mold and blown to the full size of the bottle. In so doing, the side wall of the preform as the bottle is blown is stretched and tensioned to create an exceptionally sturdy thin-walled plastic bottle. Because the end of the preform, which eventually forms the bottom of the bottle, is not stretched axially as is the side wall, the bottom of the bottle does not possess the same strength as the side wall. Therefore, a separate plastic cup is fitted and affixed to the bottom of the bottle in a subsequent operation to reinforce the bottom of the bottle and prevent cracking or leakage in the handling of the filled bottle.

SUMMARY OF THE INVENTION

Applicant's invention comprises further improvements in the configuration of the finished bottle and in the manufacture of the finished bottle to provide a collapsible bottle. The purpose of a collapsible bottle is to substantially eliminate the air space in the top of the bottle as the contents are partially used. In the case of soda pop, a previously opened and partially filled bottle, upon storage for a few hours, goes flat or dead to the taste. In large part this is due to the escape of carbon dioxide dissolved in the soda pop into the air above the pop and in the bottle. By permitting the user to collapse the vertical height of the bottle as the soda is used or just before the cap is reattached, the air space above the partially filled bottle is substantially eliminated. With the cap on the bottle the carbon dioxide in the soda pop has no air space in which to escape.

Applicant's bottle provides a side wall circumferentially shaped in the manner of bellows. The bellows are formed to overcenter as the bottle is collapsed thus preventing the bottle from returning to its full height before or after the cap is placed on the bottle. The bellows are formed in the preferred embodiment by adding a third step to the manufacture of the blown bottle. After the preform is made and then is blown and stretched in the bottle mold, additional air or nitrogen is suddenly injected into the bottle at higher pressure to drive the already stretched side wall into the grooves of the mold that form the bellows. This sudden increased pressure further stretches the side wall and thins it; in particular, over the inner circumferential ridges of the mold to form folding points or folding sections of the side wall. Thus, the bottle can be easily and quickly folded as the liquid is withdrawn therefrom. The bellows also permit the bottle to be bent over to one side thus simulating a spout for easier pouring of the liquid inside.

The cap placed on the bottom of the bottle is slightly larger and deeper than the conventional bottle bottom cap and is attached to the bottom of the collapsible bottle both to reinforce the bottom of the bottle and to provide a pocket for the bottle to fold into. The new cap is substantially smooth sided on the outside side wall thereof to form a suitable surface for the bottle labels in substitution for placing the labels on the bottle side wall. The bellows configuration makes difficult the placing of labels on the bottle itself, and the labels would interfere with the proper folding of the bottle. Thus, the folded bottle fits generally within the extended bottom cup of the bottle. The cup also provides a convenient hand grip when the bottle is partially or fully collapsed.

DESCRIPTION OF THE PREFERRED EMBODIMENTS

Figure 3:
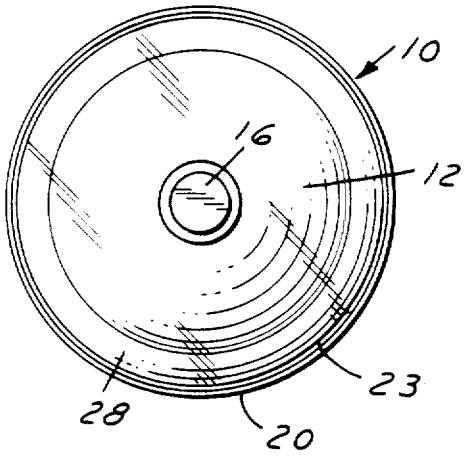
FIG. 3 is a top view of the collapsible bottle.
Figure 1:
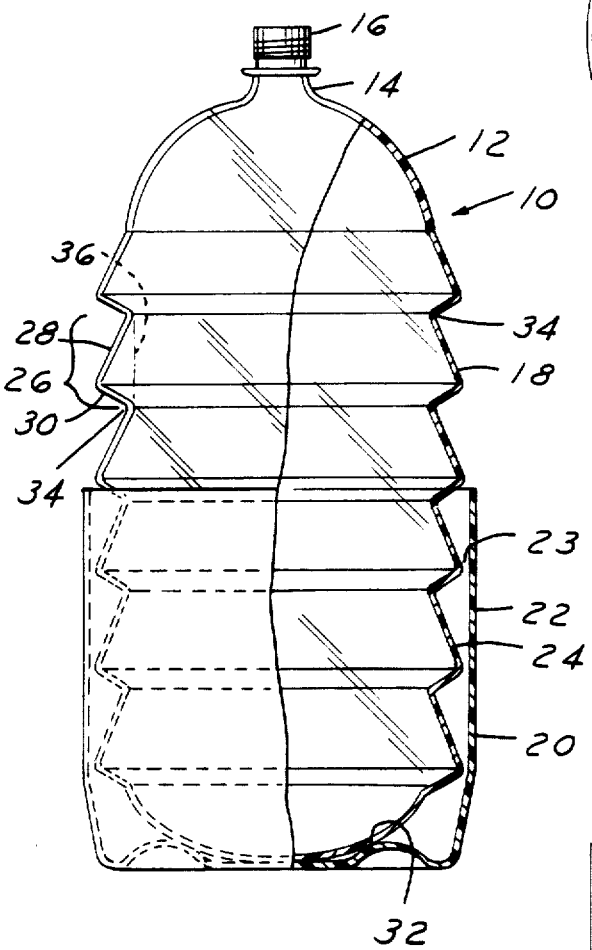
FIG. 1 is a partial side cross-sectional view of the collapsible bottle.

In FIG. 1 the bottle, generally denoted by 10, includes an upper hemispherical portion 12 having a central neck 14 for a cap 16 that may be attached and detached. The bottle 10 is formed with generally bellows-shaped sidewalls 18 and includes a separate bottom cup 20 affixed to the bottom of the bottle 10. The cup 20 side wall 22 is generally smooth to provide a suitable surface for the labels that are affixed to the bottle. Labels may also be affixed to the generally smooth hemispherical portion 12 at the top of the bottle. As illustrated in FIG. 1, the bellows-shaped side wall 18 of the bottle extends down within the cup side wall 22 as illustrated at 24. Typically the bellows extend almost to the bottom of the bottle and cup and the cup side wall extends generally toward the middle of the vertical height of the bottle.

Each bellow here indicated by 26 comprises a downwardly and outwardly extending conical portion 28 and a downwardly and inwardly extending conical portion 30 which is substantially smaller and at a much greater angle to the axis of the bottle. In the figure six bellows are shown; however, in actual practice a very large number of bellows, each of which is much smaller in proportion to the size of the bottle, is preferred. Thus, as shown, the bellows are greatly enlarged in proportion to the typical soda bottle in which the bellows are incorporated.

Figure 2:
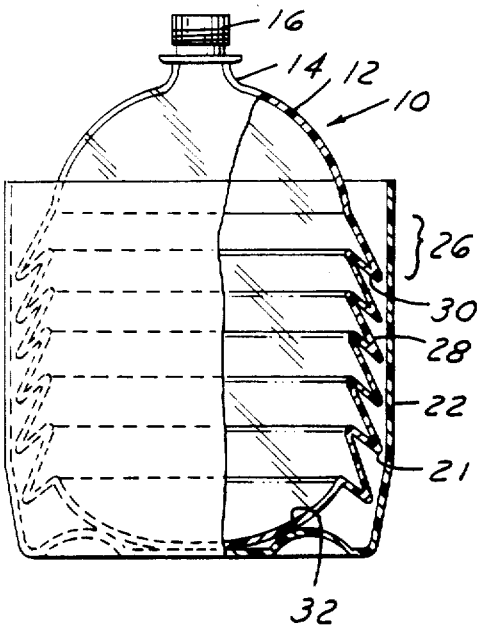
FIG. 2 is a partial side cross-sectional view of the collapsible bottle fully collapsed.

FIG. 2 illustrates the bottle substantially collapsed for a volume approximately one-half that of the expanded bottle. Thus, the bottle substantially eliminates the air volume over the liquid beverage down to the point where the bottle is half full. As shown, the individual bellows 26 are collapsed or folded over such that the short portion 30 of each bellow is folded over the long portion 28 of the adjacent bellow. In FIG. 2 as in FIG. 1 the size of each bellow in proportion to the size of the bottle is greatly exaggerated.

In actual practice the increase in diameter of the bottle attributed to the bellows is so limited as to not substantially increase the diameter of the bottle with the cup attached. The cup side wall 22 interior diameter need only be sufficient 23 to permit the bellows to fold over and become overcentered as shown in FIG. 2. The flexibility of the cup material assists in permitting the bellows to fold and snap over. Once snapped over as shown in FIG. 2, because of the cylindrical configuration of the bottle and bellows, the bellows will not expand despite the failure to replace the cap 16 on the bottle. The close proximity 21 of the sidewall 22 of the cup also assists in preventing the collapsed bellows from expanding.

The cup side wall 22 is substantially smooth to assist in attaching labels and the like to the cup and bottle combination. The cup is adhesively affixed to the bottom of the bottle as shown at 32 in both figures. It is preferred that the bellows be generally shaped as shown to obtain the overcentering action that holds the bottle collapsed. However, even without the overcentering action, the attachment of the cap to the collapsed bottle prevents the bottle from expanding due to the external atmospheric air pressure. It is envisioned that in a vast majority of instances the plastic utilized for the bottles will be a very strong flexible plastic such as acrylonitrile or similar plastic approved by the Food and Drug Administration. In some instances a relatively soft plastic may be utilized for the bottle in which case the overcentering action would not be completely satisfactory and the replacement of the cap on the bottle required to retain the partially full bottle in the collapsed state.

To assist in the folding and collapsing of bottles manufactured from stretched plastics such as are typically used currently for the more popular brands of soda pop in two liter bottles, such stretch plastics are typically formed into bottles by first creating an injection molded or blow molded preform having a relatively thick plastic wall and bottom and generally in the shape of a common laboratory test tube. The preform, heated above the heat distortion temperature of the plastic, is then blown in a bottle mold to the full bottle size and wall thickness. In the process of blowing the bottle the side wall of the bottle is stretched, which in combination with the particular plastic adds significantly to the tensile strength of the bottle side wall. After removal from the bottle mold, the bottom cup is adhesively affixed to the bottom of the bottle to reinforce the bottle bottom.

Applicant's bottle is manufactured in a similar manner; however, the cup 20 is sized in depth and inside diameter to accommodate the collapsed bellows as shown in FIG. 2. Typically, the cup will be two or more times the depth of the plastic cup on the bottom of a conventional two liter soda pop bottle. In blowing the bottle, subsequent to blowing the bottle within the bottle mold and before removal from the bottle mold, additional high pressure air or nitrogen gas is suddenly admitted to the interior of the bottle to expand the side wall of the bottle into the bellows forming grooves of the mold. The sudden expansion with the high pressure air or gas stretches the side wall further at the lesser diameters of the bellows such as 34 thereby forming a stretched circular thin spot or fold ring in the bottle wall. In addition, the conical portions 28 and 30 will be slightly stretched further as blown from the bellowless wall indicated at 36 to the final bellows configuration.

The additional thinning of the wall permits the bellows action to more easily take place with the plastic materials currently utilized and the wall thicknesses currently utilized. The additional thinning of the wall beyond that of the conventional uncollapsible bottle is not detrimental to the strength of the bottle because the ribbing effect created by the bellows configuration adds additional rigidity in all directions with the exception of the collapsing direction of the bottle. Thus, the fold rings and thinned sections of the side wall assist in creating an easily collapsible bottle that remains convenient for handling and storing.

Fully collapsed into the cup, the bottle remains easy to use and when completely emptied and stored, only takes approximately half the volume of the conventional uncollapsible soda pop bottle. In States such as Michigan, the storage of empty bottles for return to the bottling plants and distributors is a significant problem. Collapsible bottles can significantly assist in lessening the storage volumes required for large quantities of empty bottles in storage rooms before they are returned to the reprocessor of the bottles.

I claim:

1. A collapsible plastic [bottle] *container* having a top and a base joined by a substantially cylindrical side wall integral therewith and an aperture in the top, the improvement comprising a plurality of circular bellows formed by conical sections integrally joined *by lesser and greater diameter fold rings* to create at least a portion of the [bottle] *container* side wall, the conical sections comprising alternating short portions and long portions, said short portions being at a greater angle to the [bottle] *container* axis than said long portions, and the lesser diameter [junctures] *fold rings* of the long portions with the short portions being formed with a wall thickness less than the side wall thickness of the portions to create fold rings for the circular bellows.

2. The collapsible plastic [bottle] *container* of claim 1 wherein said short portions are substantially one-half the long portions in height.

3. The collapsible plastic [bottle] *container* of claim 1 wherein the greater diameter junctures of the bellows portions increase and then decrease as the bellows are folded over to provide a snap action over centering of the bellows thereby latching the bellows in the closed position.

4. The collapsible plastic [bottle] *container* of claim 1 including a cup affixed to the base of the [bottle] *container*, said cup having a side wall extending upwardly about the bottle side wall and spaced therefrom.

5. The collapsible plastic [bottle] *container* of claim 4 wherein said cup side wall extends approximately one-half the height of the bottle.

6. The collapsible plastic [bottle] *container* of claim 4 wherein the inside diameter of the cup side wall is less than the maximum outside diameter of the bellows attained during fold over.

7. The collapsible plastic [bottle] *container* of claim 4 wherein the bellows side wall of the [bottle] *container* folds into the cup side wall.

8. A collapsible plastic [bottle] *container* having a base and a top joined by a substantially cylindrical side wall integral therewith and an aperture in the top, said side wall formed into a plurality of circular bellows, said circular bellows comprising a plurality of alternately upwardly and downwardly pointed conical sections joined integrally by circular fold rings of a thickness less than the conical section thicknesses, and *said circular bellows comprising lesser and greater diameter circular fold rings* said greater diameter circular fold rings increasing to and decreasing from a maximum diameter to provide an over centering of the bellows during folding thereby latching the bellows in the collapsed position.

9. The collapsible plastic [bottle] *container* of claim 8 wherein the conical sections pointed in one axial direction are approximately twice the height of the other conical sections.

10. The collapsible plastic [bottle] *container* of claim 9 wherein the taller conical sections are at a lesser angle to the [bottle] *container* axis than the shorter conical sections.

11. The collapsible plastic [bottle] *container* of claim 8 including a cup affixed to the base of the [bottle] *container*, said cup having a side wall extending upwardly about the [bottle] *container* side wall and space therefrom.

12. The collapsible plastic [bottle] *container* of claim 11 wherein said cup side wall extends approximately one-half the height of the [bottle] *container*.

13. The collapsible plastic [bottle] *container* of claim 11 wherein the inside diameter of the cup side wall is less than the maximum outside diameter of the bellows attained during fold over.

14. The collapsible plastic [bottle] *container* of claim 11 wherein the bellows side wall of the [bottle] *container* folds into the cup sidewall.

15. A collapsible plastic [bottle] *container* having a top and a base joined by a substantially cylindrical side wall integral therewith and an aperture in the top, the improvement comprising a plurality of circular bellows formed by conical sections integrally joined to create at least a portion of the [bottle] *container* side wall, the conical sections comprising alternating short portions and long portions, said short portions being at a greater angle to the [bottle] *container* axis than said long portions, and a separate cup affixed to the base of the [bottle] *container*, said cup having a side wall extending upwardly about the [bottle] *container* side wall and spaced therefrom to contain the folded bellows.

16. The collapsible plastic [bottle] *container* of claim 15 wherein said short portions are substantially one-half the long portions in height.

17. The collapsible plastic [bottle] *container* of claim 15 wherein said cup side wall extends approximately one-half the height of the [bottle] *container*.

18. The collapsible plastic [bottle] *container* of claim 15 including a cap, said cap adapted to provide an air tight seal upon tight engagement with the [bottle] *container* about the aperture, said [bottle] *container* being retainable in the collapsed condition by the tight replacement of the cap on the [bottle] *container* with the [bottle] *container* in the collapsed condition.

*19. A collapsible plastic container having a base and a top joined by a substantially cylindrical side wall integral therewith,*

*at least a portion of said sidewall formed into a plurality of bellows extending therearound, said bellows comprising upwardly and downwardly pointed substantially conical sections joined by fold rings, and*

*said fold rings retaining substantially fixed diameters and at least some of said upwardly and downwardly pointed conical sections flexing from the unfolded to the folded position to provide an over centering of the bellows during folding thereby latching the bellows in the collapsed position.*

*20. The collapsible plastic container of claim 19 wherein the conical sections pointed in one axial direction are approximately twice the height of the other conical sections.*

*21. The collapsible plastic container of claim 19 wherein some of the conical sections differ in height and the shorter conical sections flex to provide the over centering of the bellows.*

*22. The collapsible plastic container of claim 19 wherein some of said conical sections are shorter in slope than the other conical sections and wherein said shorter conical sections flex to provide the over centering of the bellows.*

*23. The collapsible plastic container of claim 19 wherein some of said conical sections differ in angular relationship to the bottle axis.*

* * * * *